(12) United States Patent
Bent et al.

(10) Patent No.: US 7,756,467 B2
(45) Date of Patent: Jul. 13, 2010

(54) MULTIMEDIA DISTRIBUTION USING A NEAR FIELD COMMUNICATION CAPABLE WIRELESS COMMUNICATION DEVICE

(75) Inventors: David Bent, Cary, NC (US); Leland Scott Bloebaum, Cary, NC (US); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 893 days.

(21) Appl. No.: 11/565,815

(22) Filed: Dec. 1, 2006

(65) Prior Publication Data

US 2008/0132167 A1 Jun. 5, 2008

(51) Int. Cl.
*H04H 60/09* (2008.01)
(52) U.S. Cl. .................... 455/3.04; 455/3.01; 455/3.03; 455/3.05; 455/3.06; 455/418; 455/419; 455/420; 455/41.1; 455/41.2; 340/572.1; 340/572.4; 340/568.1; 340/568.5; 340/568.8; 340/539.1; 340/539.11; 340/539.17
(58) Field of Classification Search ................ 455/3.01, 455/3.03, 3.05, 3.06, 41.1, 41.2, 418–420, 455/3.04; 340/539.1, 539.11, 539.16, 539.17, 340/572.1, 572.4, 568.1, 568.5, 568.8
See application file for complete search history.

(56) References Cited

U.S. PATENT DOCUMENTS

| 7,126,481 | B2 * | 10/2006 | Vesikivi et al. | ........... 340/572.4 |
| 7,433,649 | B2 * | 10/2008 | Toulis et al. | ............... 455/41.2 |
| 2003/0120745 | A1 | 6/2003 | Katagishi et al. | |

FOREIGN PATENT DOCUMENTS

| WO | 2004/040793 A1 | | 5/2004 |
| WO | 2005/081088 A1 | | 9/2005 |
| WO | WO 2005/081088 | * | 9/2005 |
| WO | 2006/049742 A1 | | 11/2006 |

OTHER PUBLICATIONS

International Search Report and Written Opinion, International Application No. PCT/US2007/77049 Date of Mailing: Feb. 4, 2008.

* cited by examiner

*Primary Examiner*—Tuan A Tran
(74) *Attorney, Agent, or Firm*—Coats & Bennett, P.L.L.C.

(57) ABSTRACT

A wireless communication device includes a Near Field Communication (NFC) interface, a transceiver, and a controller. The NFC interface receives data related to multimedia content from an external NFC tag responsive to establishing an NFC link with the NFC tag. Based on the received data, the controller establishes a communication link with a multimedia server via a wireless communication network, and controls the multimedia server to download information associated with the multimedia content to a user-specified destination device.

25 Claims, 6 Drawing Sheets

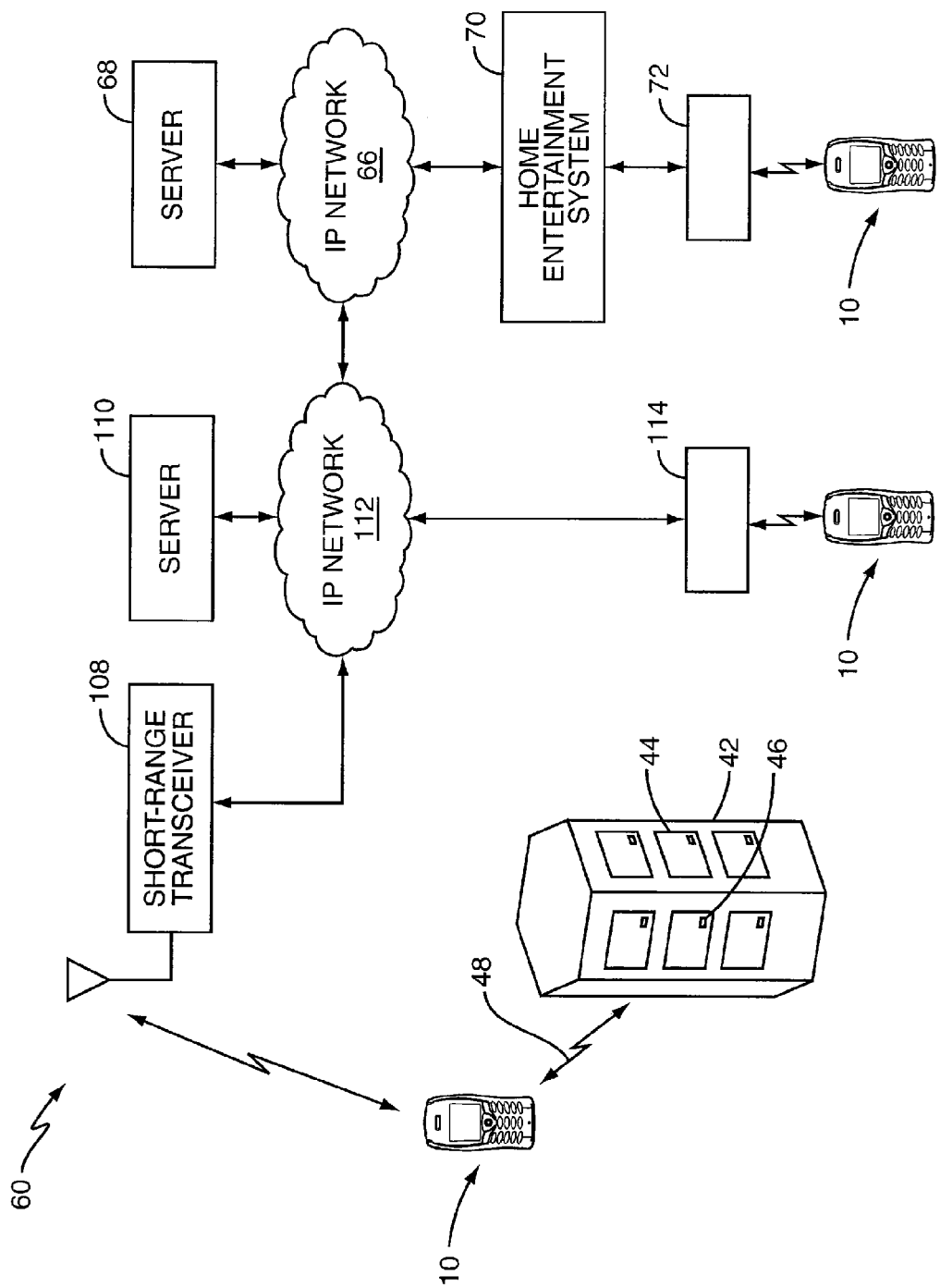

MULTIMEDIA DISTRIBUTION USING A NEAR FIELD COMMUNICATION CAPABLE WIRELESS COMMUNICATION DEVICE

BACKGROUND

The present invention relates generally to wireless communication devices, and particularly to Near Field Communication (NFC) enabled wireless communication devices.

The ability to purchase and download music and other multimedia content from on-line sources is becoming increasingly popular. However, the majority of multimedia sales still involves the physical media and occurs at physical retail locations. This may be due to a consumer's desire to "touch, see, and feel" a tangible product rather than purchase some "ephemeral" digitized version. Therefore, consumers will likely continue to view physical retail locations for their multimedia purchases as important. However, the physical media represents a large cost to the retailers. For example, physical media requires storage for physical inventory. Thus, a retailer's ability to offer a wide array of different multimedia content may be limited by the amount of storage space, or display space. Additionally, physical media is prone to theft and inadvertent destruction by consumers.

SUMMARY

The present invention is directed to a system and method of distributing multimedia content using a Near Field Communication (NFC) capable wireless communication device. The present invention reduces the need for retailers to maintain large inventories of physical media. This reduces the costs associated with maintaining such physical inventories, and allows retailers to provide a consumer with access to a larger variety of media.

In one embodiment, the system comprises a media sales display and an NFC-capable wireless communication device. The media sales display may comprise a kiosk or a display wall, for example, having one or more images. Each image corresponds to a particular multimedia content such as a collection of audio or video files. By way of example, each image may comprise the "album art" or the "cover art" of a particular Compact Disk (CD) of Digital Video Disk (DVD). Users may identify a particular CD or DVD from the image.

Associated with each image is an NFC tag that stores data related to the multimedia content represented by that image. The data may include, but is not limited to, text data that identifies audio or video files and/or the artist, one or more Uniform Resource Locators (URLs) that identify servers that sell the multimedia content, and one or more digital samples of the multimedia content. Other information is also possible.

The NFC-capable wireless communication device comprises an NFC interface, a transceiver to communicate with remote parties via a wireless communication network, and a controller. When a user is interested in purchasing multimedia content represented by a particular image on the media sales display, the user simply "touches" the selected image with the NFC-capable wireless communication device such that the NFC interface is in close physical proximity to the NFC tag associated with the selected image. This causes that NFC tag to transfer the data relating to that multimedia content to the NFC-capable wireless communication device via the NFC interface. Upon receipt of the data, the controller may parse the data for display to the user.

The user may then use this data to purchase the related multimedia content or the rights to render the related multimedia content, or to determine additional information about the multimedia content. In one embodiment, the user may select a URL from the display to launch a browser application to connect to a website on an server that offers the multimedia content. The user may navigate the website to purchase the multimedia content or the rights to render the multimedia content. Once the transaction is complete, the user may control the server to download the multimedia content and/or rights to a specified destination device.

In one embodiment the user may control the multimedia server to send information associated with the multimedia content directly to the user's NFC-capable wireless communication device via a wireless communication link. Because memory in the NFC-capable wireless communication device may be limited, the user may later transfer this information to another device or system such as a home entertainment system. By way of example, the user may place the NFC-capable wireless communication device in close physical proximity to an external NFC reader communicatively connected to the user's home entertainment system. This causes the user's NFC-capable wireless communication device to transfer the information to a computing device connected to the NFC reader. The user may then distribute the information to other storage media and/or audio or video devices for rendering.

In other embodiments, the user may control the multimedia server to send the information directly to the user's home entertainment system. In these cases, the user's computing device is communicatively connected to the multimedia server via the Internet. When the user purchases the multimedia content or the rights to the multimedia content from the website, the user may identify the IP address of the computing device, for example, as the destination device. Once downloaded, the user may distribute the information to other storage media and/or audio or video devices for rendering.

BRIEF DESCRIPTION OF THE DRAWINGS

FIG. 6 is a block diagram illustrating a network by which a portable wireless communication device may obtain multimedia content according to another embodiment of the present invention.

DETAILED DESCRIPTION

The present invention is directed to a system and method of purchasing multimedia content using a Near Field Communication (NFC) capable wireless communication device. In one embodiment, the system comprises a media sales display such as a kiosk having one or more images such as "album art." Each image corresponds to multimedia content such as one or more audio or video files, and includes an NFC tag. The NFC tag stores data related to the audio or video files.

When a user "touches" an image with an NFC-capable wireless communication device, the corresponding NFC tag transfers its data to the NFC-capable communication device. The controller parses this data for display to the user, which may include, but is not limited to, text identifying the audio or video files, one or more Uniform Resource Locators (URLs) that identify websites that sell the audio or video files, and one or more samples of the audio or video files. The user may select a sample to render or an URL to proceed to the website to purchase the audio or video files. Once purchased, the user may control the website to download the files to a user-designated destination device.

Figure 1:
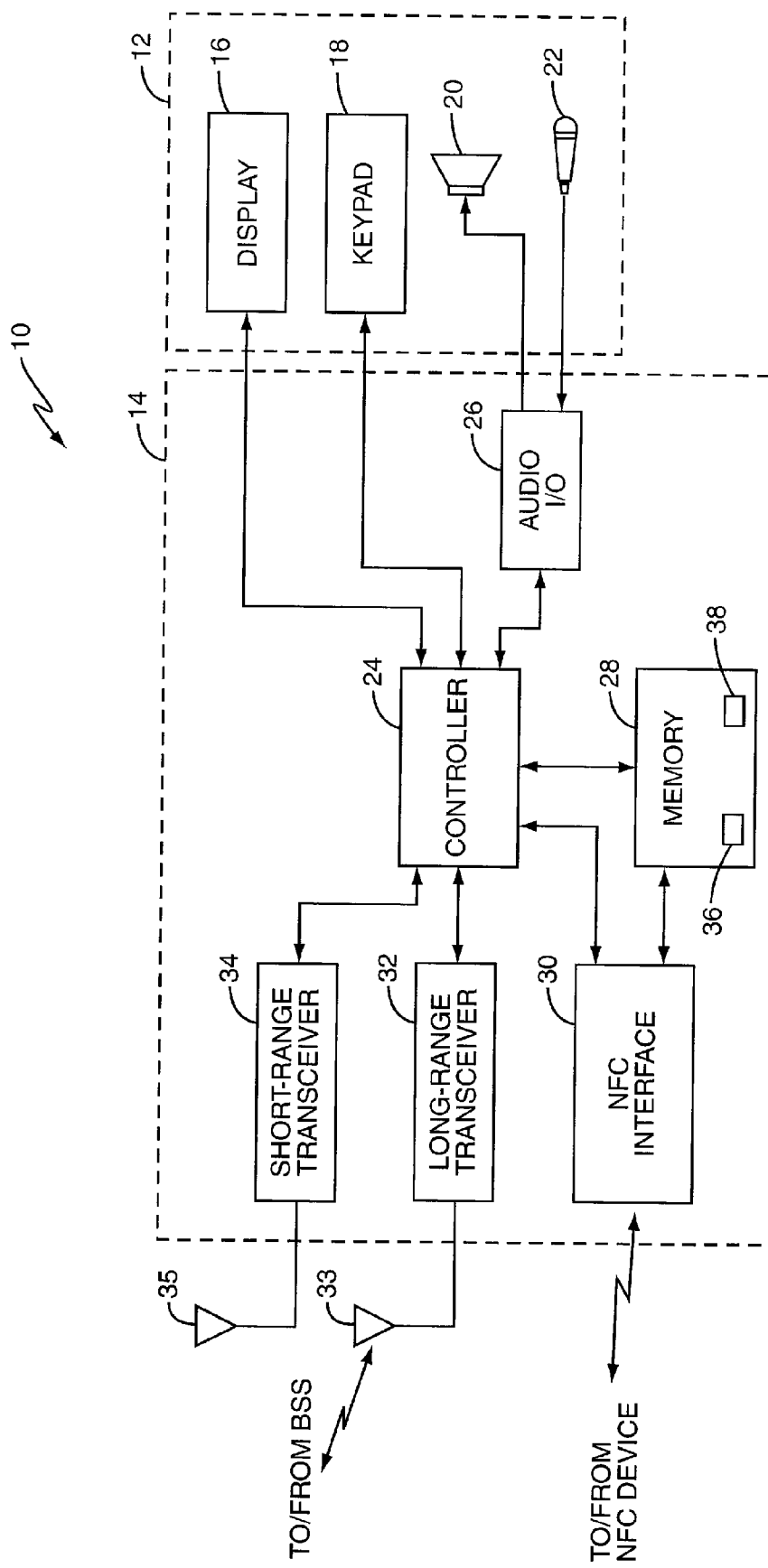
FIG. 1 is a block diagram illustrating an NFC-capable wireless communication device configured according to one embodiment of the present invention.

FIG. 1 illustrates a dual-function NFC-capable wireless communication device 10 suitable for use with the present invention. In the specification and figures, the NFC-capable wireless communication device 10 is specifically embodied as a cellular telephone; however, this is for illustrative purposes only. Those skilled in the art should appreciate that the present invention may be embodied in other types of portable consumer electronics devices including, but not limited to, a Personal Digital Assistant (PDA), a palmtop or laptop computer, a satellite phone, or other type of portable or hand-held electronic device.

NFC-capable device 10 comprises a user interface (UI) 12 and a communication circuit 14 disposed within a housing. UI 12 includes a display 16, a keypad 18, a speaker 20, and a microphone 22. Communication circuit 14 comprises a controller 24, an audio I/O circuit 26, memory 28, and a long-range transceiver circuit 32 connected to an antenna 33. As described in more detail later, some embodiments of the communication circuit 14 may comprise a short-range transceiver 34 connected to an antenna 35. Memory 28 may store one or more application programs and associated user data, such as browser application 36 and user profile 38, for use by controller 24.

The operation of the UI 12 and the communication circuit 14 with respect to communicating with a remote party via a Base Station Subsystem (BSS) is well known in the art. Therefore, this functionality is not described in detail herein. It is sufficient for the purposes of the present invention to understand that the NFC-capable device 10 is a fully functional cellular radio device capable of operating according to any known standard. Such standards include, but are not limited to, Global System for Mobile Communications (GSM), Universal Mobile Telecommunication System (UMTS), TIA/EIA-136, Code Division Multiple Access (CDMA), cdmaOne, cdma2000, and Wideband CDMA.

In addition to the components that facilitate communications with remote parties, NFC-capable device 10 also comprises a Near Field Communication (NFC) interface 30. Near Field Communication technology is known in the art, therefore, only a brief description of this technology appears here for context. However, interested readers can learn more about NFC technology by reading the specification documents that standardize this technology. These specifications documents currently include, the "NFC Data Exchange Format (NDEF) Technical Specification," the "NFC Record Type Definition (RTD) Technical Specification," the "NFC Text RTD Technical Specification," and the "NFC URI RTD Technical Specification." Each of these documents was released as version 1.0 on Jul. 24, 2006, and are incorporated herein by reference in their entirety.

Near Field Communication is a short-range wireless connectivity technology that uses magnetic field induction to permit devices to share information with each other. Usually, NFC devices operate at a frequency of 13.56 MHz and may transfer data at rates up to 424 Kbs; however, data transfer rates of up to 2 Mbps and above may soon be possible. Communication between two NFC-capable devices occurs when they are brought into contact with each other, or within close physical proximity of one another. The distance separating two NFC-capable devices can be anywhere between about 0 and 4 centimeters; however, the distance can be up to about 20 centimeters.

NFC devices may comprise, for example, a "tag" or chip, and may or may not include their own internal power supply. Some NFC devices may also draw power from an external power supply such as a battery. Those NFC devices having their own power supply or that draw power from an external supply are termed "active" devices, while those devices that do not include their own power supply are termed "passive" devices. Passive NFC devices utilize a magnetic field radiated by an active NFC device, such as an NFC reader, for power. Once the active NFC device is close enough to the passive NFC device, the energy from the magnetic field powers the passive NFC device so that it can establish an NFC communication link and communicate data with the active NFC device.

In the embodiment of FIG. 1, NFC interface 30 comprises an "active" transceiver circuit capable of communicating information and data with an external NFC-capable device such as a passive NFC tag. NFC interface 30 may include its own power supply, or draw power from a battery associated with the device 10, such that it powers the external NFC-capable device. Once an NFC link is established, the external NFC device transmits information and/or data stored in its memory to the NFC interface 30.

NFC interface 30 is not limited to communicating information and data solely with passive NFC devices. In other embodiments, for example, the NFC interface 30 operates in a "peer" mode with other external active NCF devices. Once the two devices are placed within close physical proximity of each other, the data exchange between the two devices is bidirectional. In another embodiment, to conserve power, the NFC interface 30 operates in a "tag emulation" mode. In this mode, the NFC interface 30 "sleeps" until it detects magnetic energy from another external NFC device such as an NFC reader. Detecting the magnetic energy triggers the NFC interface 30 to "wake up." The NFC interface 30 may then operate like a programmable tag to communicate data to/from the external NFC device. Thus, NFC interface 30 is capable of transmitting and receiving information and or data to an external NFC device.

According to the present invention, the user's NFC-capable device 10 may be part of a system that permits the user to purchase a variety of multimedia content from an NFC-capable retail media display. In one embodiment, the user places the NFC-capable device 10 within close proximity of an NFC-capable kiosk, for example, that includes one or more images associated with a variety of multimedia content. Each image corresponds to a Compact Disk (CD) or Digital Video Disk (DVD), and includes an NFC tag that stores information and data related to the CD or DVD. When the user places NFC-capable device 10 in close proximity to a selected image, the associated NFC tag transfers its information and/or data to the NFC interface 30. The user may then use that information and/or data to purchase the CD or DVD associated with the selected image.

Figure 2:
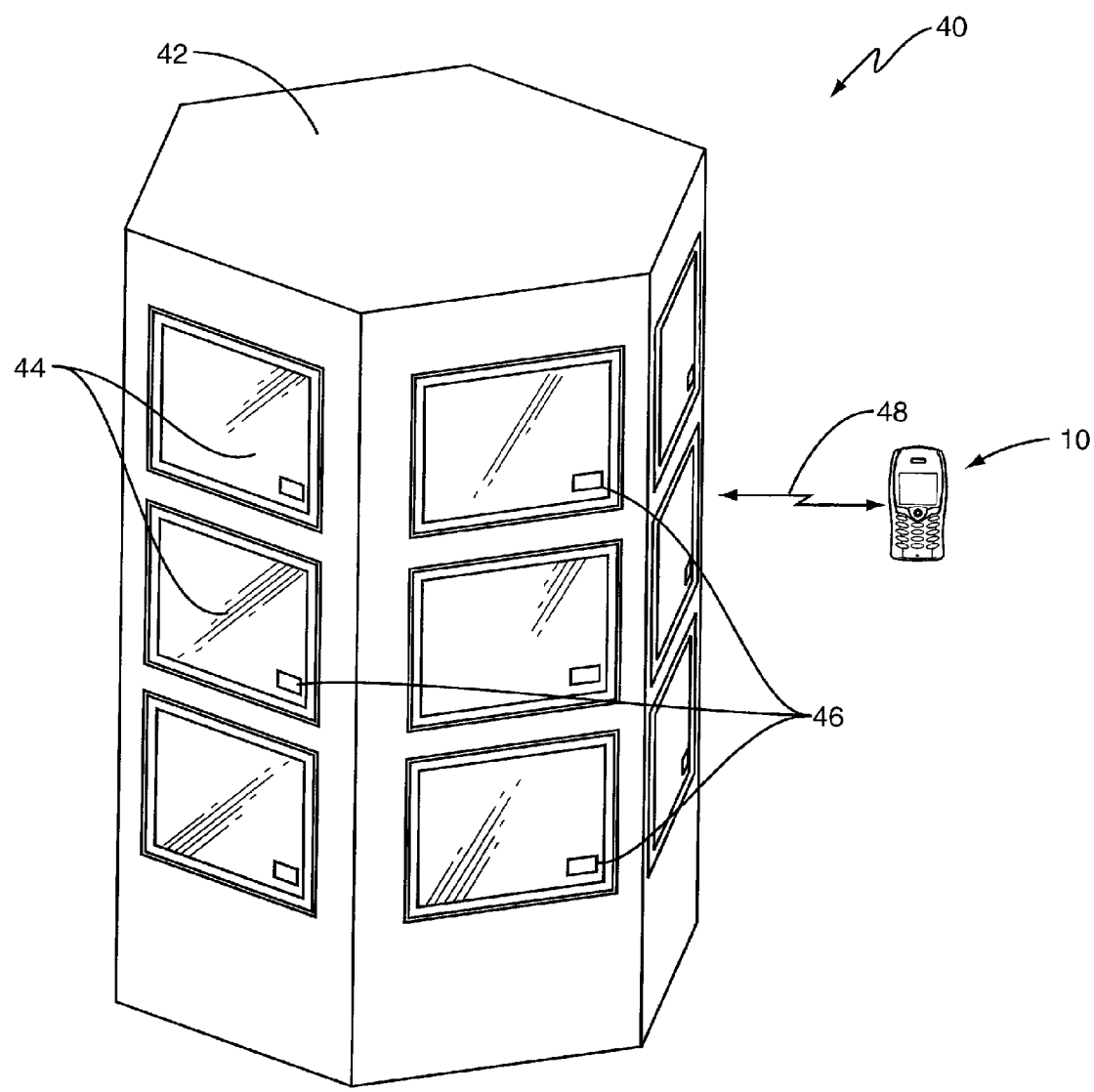
FIG. 2 is a perspective view illustrating a system configured according to one embodiment of the present invention.

FIG. 2 illustrates such a system 40 according to one embodiment of the present invention. The system 40 comprises an NFC-capable retail media display such as kiosk 42. Kiosk 42 includes a plurality of images 44 such as "album art" or "cover art," each of which is associated with a CD or DVD that the user may recognize and wish to purchase.

Each image 44 further includes its own passive NFC tag 46 that may be programmed with information and/or data related to its associated image 44. For example, the NFC tag 46 may be programmed with text that identifies the title of a CD or DVD, the artist(s) associated with the CD or DVD, the songs or tracks that are included with the CD or DVD, the cost or other information to purchase the CD or DVD, and a digital sample or video clip of the CD or DVD. The NFC tags 46 may also include one or more Uniform Resource Locators (URLs) of websites on remote servers where the user may purchase the CD or DVD, or download samples tracks or video clips. Other information and data may also be programmed into NFC tag 46 as needed or desired.

In one embodiment, each NFC tag 46 is located proximate a "target" such as some well-recognized symbol on image 44 that readily identifies the location of the NFC tag 46 for the user. To obtain the information or data for a particular image 44, the user places the NFC-capable device 10 in close physical proximity to the NFC tag 46 or physically contacts the NFC-capable device 10 to the associated NFC tag 46. This establishes an NFC communication link 48 between the NFC interface 30 in device 10 and the NFC tag 46, and causes the NFC tag 46 to transfer its information and data to the user's NFC-capable device 10.

The data may be transferred to the NFC-capable device 10 using a variety of message formats. In one embodiment, for example, the NFC tag 46 transfers the data payload in an NFC Data Exchange Format (NDEF) message. This message format is described in the "Smart Poster Record Type Definition Technical Specification, SPR 1.1," provided by the NFC Forum. This document was released as version 1.0 on Jul. 24, 2006, and is incorporated herein by reference in its entirety. In another embodiment, the NFC tag 46 transfers the data to the NFC-capable device 10 in a file formatted according to an extensible Markup Language (XML) format. XML files are text files that are capable of describing many different types of data. XML files may also contain data such as the digitized samples of the present invention. XML formats are also well-known in the art, and thus, are not described in detail here. However, the interested reader is referred to the "Extensible Markup Language (XML) 1.0 (Fourth Edition)," by Bray et. al., for more information. That specification is dated Aug. 16, 2006, and is incorporated herein by reference in its entirety.

Figure 3:
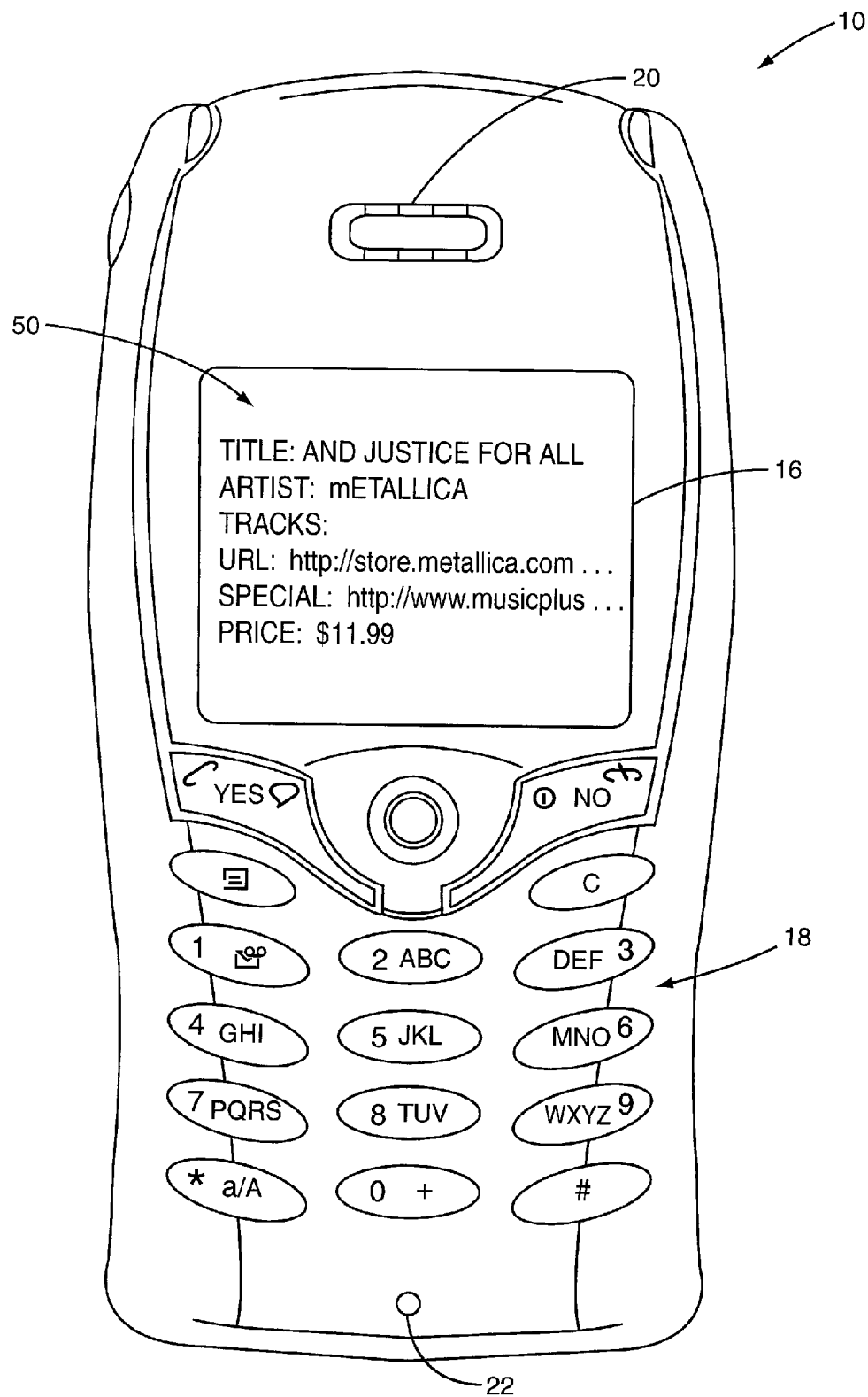
FIG. 3 is a perspective view illustrating a NFC-capable wireless communication device according to one embodiment of the present invention.

Once the data is transferred to the user's device 10, the controller 24 may parse the data and send it to the display 16. FIG. 3, for example, illustrates how the data transferred from a selected NFC tag 46 may appear to a user in one embodiment of the present invention. The display 16 shows the data as a list 50 having a plurality of entries. In this embodiment, the list 50 includes the title of a CD, the artist associated with the CD, the names of the tracks included with the CD, a URL where the user can purchase the CD, and a price associated with purchasing the CD. In some embodiments, the list 50 may also include one or more specially-designated URLs that sell the CD coupled with free or discounted items for the user. The user may use the keypad 18 to navigate the list 50 and select one or more of the list entries.

By way of example, the user may employ the keypad 18 to highlight and select the "TRACKS" entry. The display 16 may change to show a listing of the tracks available on the CD. If the NFC tag 46 transferred digital samples of the tracks, the user may highlight and select one or more of the tracks to render the sample over speaker 20. Similarly, highlighting and selecting one of the URLs in list 50 may launch the browser application 36 that connects the user to the indicated website. The user may use keypad 18 to navigate the website to download and/or purchase individual songs or the entire CD. The user may download the purchased material to the NFC-capable device 10 or to another user-specified destination.

Figure 4:
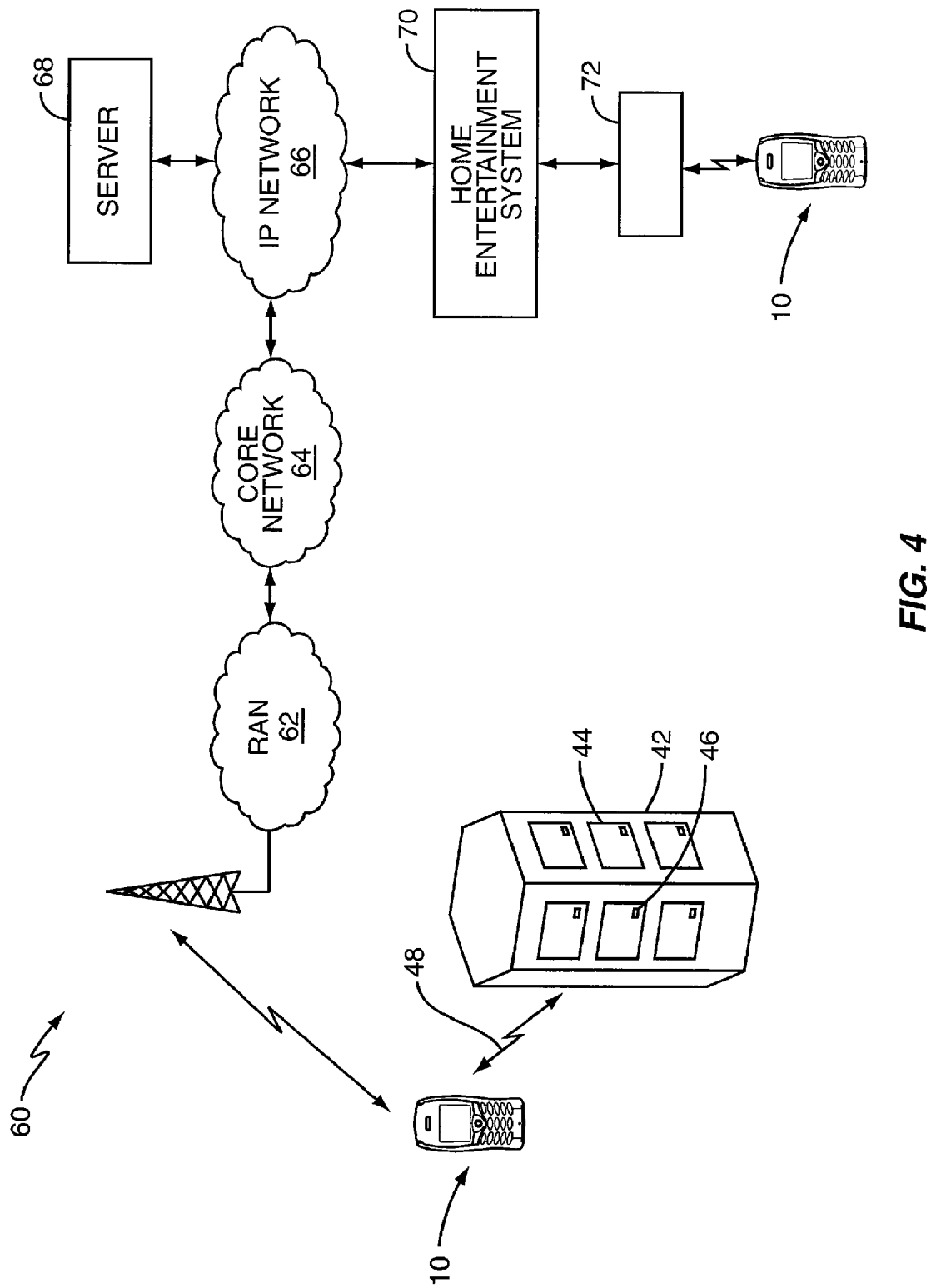
FIG. 4 is a block diagram illustrating a network by which a portable wireless communication device may obtain multimedia content according to one embodiment of the present invention.

FIG. 4 is a block diagram that illustrates an exemplary system 60 in which NFC-capable device 10 may purchase and download a CD or DVD according to one embodiment of the present invention. System 60 comprises a wireless communications network having a Radio Access Network (RAN) 62 and a Core Network (CN) 64. The operation of the RAN 62 and CN 64 is well-known in the art, and therefore, not described in detail here. It is sufficient to understand that the wireless communications network RAN 62 and CN 64 allows the user of NFC-capable device 10 to communicate voice and/or data traffic with one or more remote parties.

Core Network 64 may also connect to an IP network 66 such as the Internet through which the user of NFC-capable device 10 may access a third party server 68 and a home entertainment system 70. In one embodiment, server 68 comprises a third party server for storing and selling multimedia content to the user. The home entertainment system 70 may comprise a plurality of interconnected home audio and/or video devices for rendering audio and/or video to the user. For example, the home entertainment system 70 may include a DVD player, a CD player, a television or home theater system, an audio system, and a computing device connected to the Internet to control the various components. Other audio and/or video components are also possible. An external NFC device 72 such as an NFC reader, for example, connects to the home entertainment system 70. The external NFC device 72 allows the user to establish an NFC communication link 74 between the user's handheld NFC-capable device 10 and the home entertainment system 70.

Figure 5:
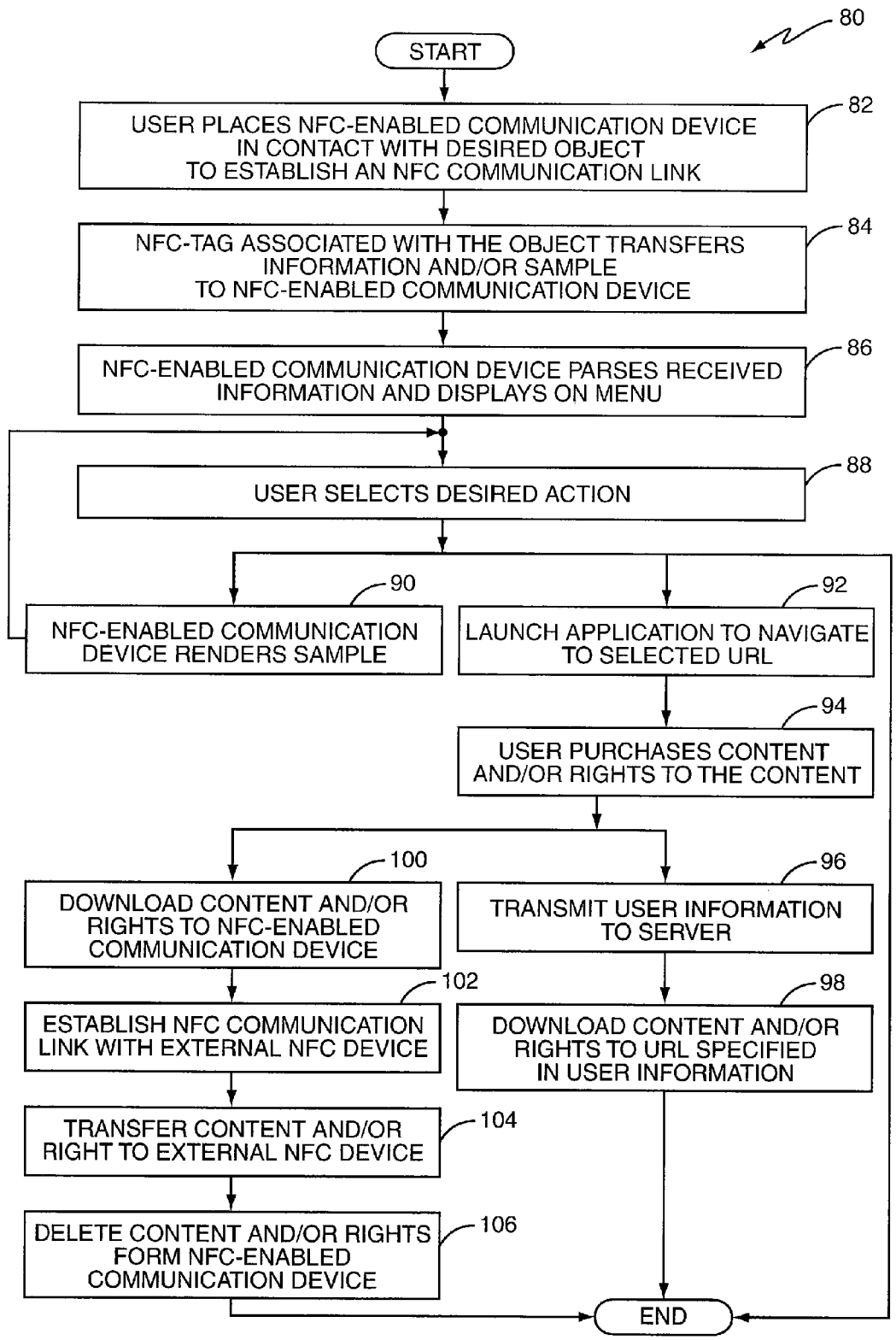
FIG. 5 is a flow chart illustrating a method according to one embodiment of the present invention.

FIG. 5 illustrates a method 80 of purchasing multimedia content according to one embodiment of the present invention. While the discussion of FIG. 5 appears in the context of purchasing a music CD, those skilled in the art should readily appreciate that the method 80 may be used to purchase and/or distribute other forms of multimedia content such as video, images, application programs, and the like.

Method 80 begins when the user touches an NFC tag 46 associated with a desired image 44 on kiosk 42 with the NFC-capable device 10. This establishes a first NFC link 48 between the user's NFC-capable device 10 and the NFC tag 46 (box 82). The NFC tag 46 then transfers data related to the audio files associated with the image 44 to the NFC-capable device 10 via the NFC link 48 (box 84). The data may include, but is not limited to, text information relating to the title, artist, and tracks of the multimedia content, as well as one or more digital samples of the multimedia content that the user may render.

The controller 24 in the NFC-capable device 10 may parse the received data for display to the user as list 50 (box 86). Using the UI 12, the user may highlight and select one or more entries from the list 50 prior to purchasing the multimedia content (box 88). For example, if the NFC tag 46 transferred digital samples of the tracks, the user may render those samples by selecting the tracks from list 50. This could launch an audio player application, for example, to render the sample audio (box 90). This permits the user to sample the multimedia content being offered by the kiosk 42 prior to purchase.

If the user decides to purchase the multimedia content, the user may highlight and select one of the URLs in list 50. In one embodiment, selecting a URL from list 50 causes the controller 24 to generate a control signal that launches browser application 38 on NFC-capable device 10 to connect to server 68 (box 92). The user may then navigate one or more web pages and/or links to purchase the multimedia content and/or the rights to the multimedia (box 94).

To complete the purchase, the user may be required to provide the server 68 with user information (box 96). In one embodiment, the user may be presented with one or more data entry screens for the user to manually enter personal information such as credit card number, billing address, and an IP address or telephone number associated with a destination component in a home entertainment system 70. Alternatively, controller 24 may generate a control signal to send a user profile 36 to the server 68. The user profile 38 is stored in memory 28, and contains information specific to the user. The controller 24 may send the information in the user profile 36 either automatically or responsive to the user's command. In some embodiments, this user information may be stored at server 68. In these latter cases, the user may be presented with a screen displaying the user information for purposes of confirming the user information.

Once purchased, server 68 downloads the multimedia content to the user-specified destination device. In this embodiment, the destination device comprises a computing device interconnecting the server 68 and the home theater system 70 (box 98). The user may then transfer the multimedia content directly to an appropriate playback device, such as a CD player, communicatively connected to the computing device. Alternatively, the user may use a third party software package to transfer the downloaded files to a storage medium such as a CD.

If the NFC-capable device 10 includes sufficient memory 28, the user may choose to download the multimedia files to the NFC-capable device 10 via RAN 62 and CN 64 (box 100). In such embodiments, the user may render the content on the device 10, or transfer the content to the home entertainment system 70 later. To facilitate transferring the downloaded content to the home entertainment system 70, the user may establish a second NFC communication link 74 with the external NFC device 72 (box 102).

Once the NFC link 74 is established, the controller 24 could generate a control signal to transfer the downloaded content and/or rights to the external NFC device 72 (box 104). The external NFC device 72 could, in turn, transfer the multimedia content to the computing device or other component of the home entertainment system 70. As above, the user may later employ the computing device to transfer the multimedia content directly to an appropriate playback device or storage medium. Once transferred from the NFC-capable device 10, controller 24 may generate a control signal to remove the multimedia content from memory 28 (box 106).

Those skilled in the art should appreciate that the present invention is not limited to downloading only the actual multimedia content. In other embodiments, the user may use method 80 to purchase the rights to render the multimedia content from the server 68. By way of example, server 68 may provide the user a right to render a purchased song on a limited number of pre-identified playback devices at the time of purchase. The user may extend these rights to additional playback devices by using the method 80 above to purchase additional licenses from the server 68. The additional licenses may or may not be time-qualified to limit the user as to the valid life of the rights. In addition, the rights may be purchased in concert with, or independently of, the multimedia content.

Additionally, the present invention is not limited to downloading the multimedia content to NFC-capable device 10 via long-range cellular communications link. FIG. 6, for example, illustrates another embodiment where the NFC-capable device 10 establishes a short-range communication link with a corresponding short-range transmitter associated with the retailer having the kiosk 42, and downloads the multimedia content and/or the rights to the multimedia content via the short-range interface.

As seen in FIG. 6, the retailer may include a short-range transceiver 108 connected to a server 110 via a local IP network 112. Short-range transceiver 108 comprises a transceiver that operates according to any known standard. Such standards include, but are not limited to, any of the well-known BLUETOOTH, Wi-Fi, or WiMax family of standards. Server 110 may be any server known in the art configured to store and sell multimedia content to the user. In this embodiment, server 110 is located at the retail store and stores the multimedia content associated with the images 44 on kiosk 42; however, server 110 may be located off-site. The local IP network 112 may be a local area network (LAN), for example, that interconnects server 110 and short-range transceiver 108. Additionally, local IP network 112 may provide a connection to the home entertainment system 70 and/or server 68 via IP network 66.

As in the previous embodiments, the user of the NFC-capable device 10 may touch the NFC-capable device 10 to an NFC tag 46 on kiosk 48 to obtain data associated with a selected image 44. The user may then access server 110 via the short-range interface established between the NCF-capable device 10 and the short-range transceiver 108 to download samples of the selected content and/or to purchase the multimedia content and/or rights as previously described. The purchased data is then transmitted to the NFC-capable device 10 via the short-range interface. The user may then transfer that data to the home entertainment system 70 via the NFC reader 72, or via networks 112, 66 as previously described. In some embodiments, server 110 may access server 68 if needed to obtain information and/or the multimedia content.

The user of NFC-capable device 10 may also download the selected multimedia content from server 110, 68 via an NFC interface. Particularly, the retailer may have an external NFC device 114 to facilitate Point of Sale (PoS) transactions between the retailer and consumers. Suitably configured NFC-capable devices 10 may establish an NFC link with the external NFC device 11 4 and transfer the data received from the NFC tag 44. The external NFC device 114 could retrieve samples, multimedia content, and/or the rights to that content for a selected image 44 from server 68, 110, and transfer that data to the user's NFC-capable device 10 or some other user-specified destination. The user could then pay for the purchased multimedia content via the NFC link as is known in the art.

Those skilled in the art should realize that the NFC-capable device 10 of the present invention is not limited to being embodied as a cellular telephone or any other type of communications-enabled device. In some embodiments, for example, device 10 may comprise an NFC-enabled Personal Digital Assistant (PDA), computing device, or other handheld consumer electronic device configured to receive data related to a selected image 44.

Further, NFC-capable device 10 need not be associated with a user, but rather may be associated with a kiosk 42. Particularly, kiosk 42 could include its own NFC-capable device 10. Consumers who might not possess their own NFC-capable device 10 could use the kiosk-associated device 10 to receive data from the NFC tag 46, obtain samples, purchase the multimedia content, and download the purchased multimedia content to a specified destination as previously described.

The present invention also does not limit the user to purchasing the whole of the multimedia content associated with a selected image 44. For example, where the image 44 represents an audio CD, the user of device 10 may selectively purchase one or more portions of the multimedia content (e.g., one or more individual song titles). In some embodiments, the user may download other multimedia content associated with the selected image 44 including, but not limited to, ringtones, images, and movie clips.

The system of the present invention provides a variety of benefits. For example, the present invention minimizes the need for retail stores to maintain a large inventory of physical media. This reduces the costs associated with maintaining such large physical inventories as well as those associated with the theft of physical media. It also allows retail stores to provide the consumer with access to a wider variety of media including back catalogs as well as the latest releases. The consumer benefits because he or she can sample the media content prior to purchasing the content. Additionally, because the actual physical media need not be displayed, retail stores gain additional wall space with which they can display other items.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless communication device comprising:
    a Near Field Communication (NFC) interface configured to receive data related to multimedia content from an external NFC tag responsive to establishing a first NFC link with the NFC tag;
    a transceiver configured to communicate with a multimedia server via a communication network; and
    a controller configured to:
        establish a communication link with the multimedia server based on the received data, and to control the multimedia server to download information associated with the multimedia content to a user-specified destination device.

2. The wireless communication device of claim 1 further comprising a display, and wherein the controller is configured to parse the received data, and display the parsed data to the user.

3. The wireless communication device of claim 2 wherein the parsed data includes a Uniform Resource Locator (URL) of the multimedia server, and wherein the controller is configured to establish the communication link with the multimedia server based on the URL.

4. The wireless communication device of claim 2 wherein the parsed data includes a sample of the multimedia content, and wherein the controller is configured to render the sample to the user.

5. The wireless communication device of claim 1 wherein the user-specified device comprises a home entertainment system connected to the multimedia server via the Internet.

6. The wireless communication device of claim 1 wherein the user-specified destination device comprises the wireless communication device, and wherein the NFC interface is further configured to establish a second NFC link with an external NFC reader associated with a home entertainment system.

7. The wireless communication device of claim 6 wherein the controller is configured to download the information associated with the multimedia content to the home entertainment system over the second NFC link.

8. The wireless communication device of claim 1 wherein the information associated with the multimedia content comprises the multimedia content.

9. The wireless communication device of claim 1 wherein the information associated with the multimedia content comprises a license to render the multimedia content.

10. A method of distributing multimedia content using a wireless communication device, the method comprising:
    establishing a first Near Field Communication (NFC) link between an NFC interface in a wireless communication device and an external NFC tag associated with multimedia content;
    receiving data related to the multimedia content from the NFC tag responsive to establishing the first NFC link;
    establishing a communication link between the wireless communication device and a multimedia server; and
    controlling the multimedia server to download information associated with the multimedia content to a user-specified destination device based on the data received from the NFC tag.

11. The method of claim 10 further comprising parsing the received data and displaying the parsed data to the user.

12. The method of claim 11 wherein establishing the communication link comprises connecting to the multimedia server based on a Uniform Resource Locator (URL) included with the received data.

13. The method of claim 11 further comprising rendering a portion of the multimedia content to the user based on a digitized sample of the multimedia content included with the received data.

14. The method of claim 10 wherein the user-specified destination device comprises a home entertainment system communicatively connected to the multimedia server.

15. The method of claim 10 wherein the user-specified destination device comprises the wireless communication device, and further comprising establishing a second NFC link with an external NFC reader associated with a home entertainment system.

16. The method of claim 15 wherein the controller is configured to download the information associated with the multimedia content to the home entertainment system over the second NFC link.

17. The method of claim 10 wherein the information associated with the multimedia content comprises the multimedia content.

18. The method of claim 10 wherein the information associated with the multimedia content comprises a license to render the multimedia content.

19. A multimedia distribution system comprising:
    a Near Field Communication (NEC) capable media display comprising one or more images, each image being associated with multimedia content; and
    a wireless communication device comprising:
        an NFC interface configured to establish an NFC link with the NFC capable media display and to receive data regarding the multimedia content associated with a selected image; and
        a controller configured to communicate with a multimedia server via a communication network based on the received data, and to download information associated with the multimedia content from the multimedia server to a user-specified destination device.

20. The system of claim 19 wherein each image comprises an NFC tag that stores the data representing the multimedia content associated with that image.

21. The system of claim 20 wherein the first NFC link is established responsive to the NFC interface being placed in close physical proximity to the NFC tag.

22. The system of claim 19 wherein the user-specified destination device comprises a home entertainment system communicatively connected to the multimedia server.

23. The system of claim 19 wherein the user-specified destination device comprises the wireless communication device.

24. The system of claim 19 wherein the NFC interface is further configured to establish a second NFC link with an external NFC reader communicatively connected to a home entertainment system.

25. The system of claim 24 wherein the NFC interface is further configured to transfer the information associated with the multimedia content to the NFC reader over the second NFC link.

* * * * *